US012314009B2

(12) United States Patent
Robuschi

(10) Patent No.: US 12,314,009 B2
(45) Date of Patent: May 27, 2025

(54) TRANSMISSION MECHANISM FOR A HOROLOGICAL MOVEMENT

(71) Applicant: MANUFACTURE D'HORLOGERIE AUDEMARS PIGUET SA, Le Brassus (CH)

(72) Inventor: Nicolò Robuschi, Neuchâtel (CH)

(73) Assignee: MANUFACTURE D'HORLOGERIE AUDEMARS PIGUET SA, Le Brassus (CH)

( * ) Notice: Subject to any disclaimer, the term of this patent is extended or adjusted under 35 U.S.C. 154(b) by 759 days.

(21) Appl. No.: 17/549,121

(22) Filed: Dec. 13, 2021

(65) Prior Publication Data

US 2022/0187767 A1 Jun. 16, 2022

(30) Foreign Application Priority Data

Dec. 16, 2020 (CH) .................................... 01599/20

(51) Int. Cl.
*G04B 13/02* (2006.01)
*G04B 5/18* (2006.01)

(52) U.S. Cl.
CPC ............... *G04B 13/02* (2013.01); *G04B 5/18* (2013.01)

(58) Field of Classification Search
CPC .................................. G04B 13/02; G04B 5/18
USPC .......................................................... 368/208
See application file for complete search history.

(56) References Cited

FOREIGN PATENT DOCUMENTS

| | | | | | |
|---|---|---|---|---|---|
| CH | 706350 | A1 * | 10/2013 | ............... | G04B 5/10 |
| CH | 707942 | A2 * | 10/2014 | ............... | G04B 5/14 |
| CH | 708811 | A2 * | 5/2015 | ............. | G04B 5/184 |
| CH | 713407 | A2 * | 7/2018 | ............. | F16D 41/12 |
| DE | 102007046689 | | 12/2008 | | |
| DE | 102008051197 | | 4/2010 | | |
| EP | 3203326 | A1 * | 8/2017 | ........... | G04B 11/006 |
| EP | 3 203 326 | | 3/2020 | | |
| FR | 1022726 | | 3/1953 | | |
| WO | WO-2012150492 | A1 * | 11/2012 | ............... | G04B 5/08 |

OTHER PUBLICATIONS

Search Report for CH15992020, dated May 19, 2021, 3 pages.

* cited by examiner

*Primary Examiner* — Edwin A. Leon
*Assistant Examiner* — Kevin Andrew Johnston
(74) *Attorney, Agent, or Firm* — NIXON & VANDERHYE

(57) ABSTRACT

A transmission horological mechanism is disclosed, which includes: a transmission wheel including a driving plate, intended to pivot about a first axis of rotation in response to the movements of a driving wheel; and a link organ having a flexible portion and bearing a unidirectional transmission organ arranged to cooperate with an output wheel intended to drive a driven wheel when the driving wheel is displaced in a first direction of displacement. The link organ includes: a base secured to the driving plate and arranged to exhibit a rotational movement about the first fixed axis of rotation, in response to the movements of the driving wheel; and a first arm extending from the base and bearing the unidirectional transmission organ at its distal end, the flexible portion being arranged on the first arm.

31 Claims, 2 Drawing Sheets

Fig. 1
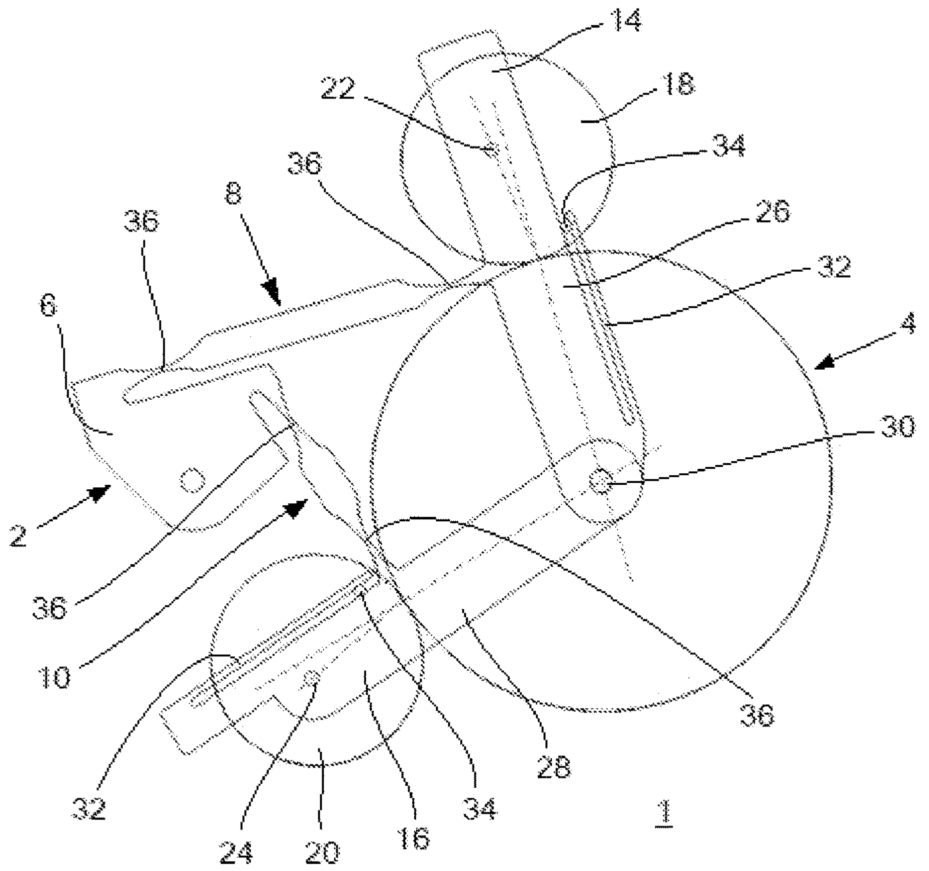
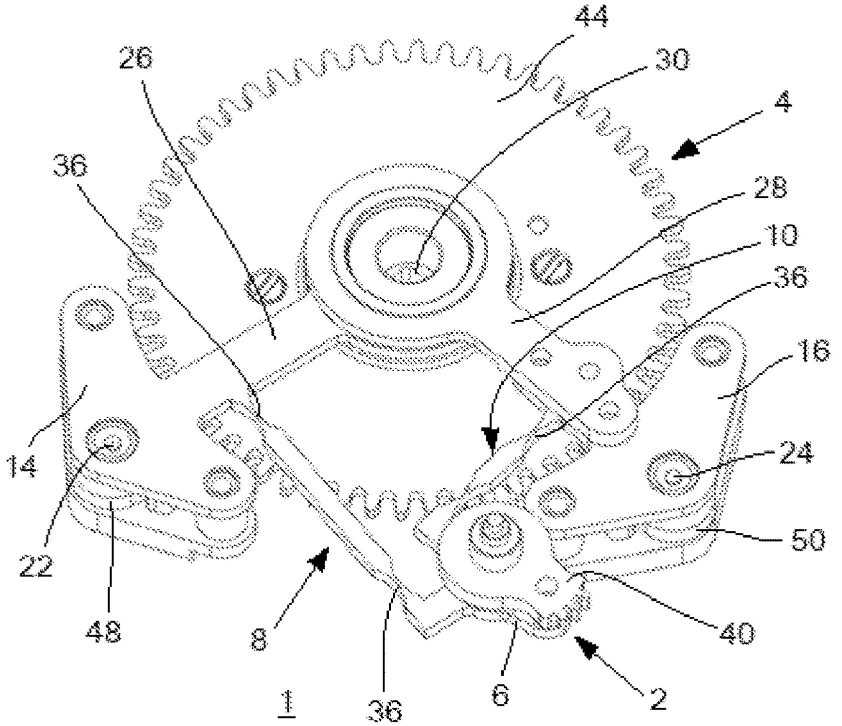
Fig. 2

TRANSMISSION MECHANISM FOR A HOROLOGICAL MOVEMENT

CROSS-REFERENCE TO RELATED APPLICATIONS

This application claims priority to CH Patent Application No. 01599/20 filed Dec. 16, 2020, the entire contents of which is hereby incorporated by reference.

BACKGROUND OF THE INVENTION

Field of the Invention

The present invention relates to a transmission mechanism, for a horological movement, intended to transmit the movements of a driving wheel to a driven wheel of the horological movement, the mechanism comprising a transmission wheel comprising a driving plate, intended to be linked kinematically to the driving wheel and to pivot about a first fixed axis of rotation in response to the movements of the driving wheel, and a link organ having a flexible portion and bearing a unidirectional transmission organ arranged to cooperate with a driving surface of an output wheel intended to be linked to the driven wheel, and to drive it when the driving wheel is displaced in a first direction of displacement.

According to a preferred embodiment, the invention relates to an automatic winding mechanism comprising a transmission mechanism of this type to make the link between a winding mass and a mechanical energy storage device.

The present invention relates also to a horological movement provided with such a transmission mechanism and a timepiece comprising such a horological movement.

DESCRIPTION OF THE RELATED ART

Horological mechanisms of this type are already known in the prior art, in particular in relation to automatic winding mechanisms.

Thus, for example, the patent EP 3203326 B1 illustrates and describes a transmission mechanism matching the above features. More specifically, this transmission mechanism is intended to convert the bidirectional rotational movement of a winding mass into a unidirectional movement that makes it possible to ensure the winding of a barrel spring. To this end, the mechanism comprises a first rotary wheel intended to be driven by the movements of the winding mass, in one direction or in the other. This first wheel bears a transmission disc that is off-centre with respect to the axis of rotation of the first wheel and arranged to drive a transmission organ by a circular translational movement. The transmission organ cooperates in turn with a clutch organ arranged to allow a unidirectional rotational driving of an output wheel intended to be linked to an end of a barrel spring, to ensure the charging thereof. To this end, the transmission organ bears two driving surfaces that can have an over-centre link with the clutch organ, each of which is associated with a given direction of rotation. For each direction of rotation of the winding mass, the driving surfaces are alternately brought closer to and away from the clutch organ, in a to-and-fro motion, by virtue of the circular translational movement of the transmission organ. Thus, the driving surfaces cooperate alternately with the clutch organ to drive it in rotation in one and the same direction of rotation.

Such a construction requires great precision in production and in the positioning of the various components involved, to ensure that the trajectory of the driving surfaces makes it possible to effectively obtain the over-centre link targeted with the clutch organ.

SUMMARY OF THE INVENTION

One main aim of the present invention is to propose a horological transmission mechanism that has an alternative construction that is more compact and sensitively simplified compared to the conversion mechanism which has just been described.

To this end, the present invention relates more particularly to a transmission mechanism of the type indicated above, characterized

- by the fact that the link organ comprises a base secured to the driving plate and arranged to exhibit a rotational movement about the first fixed axis of rotation, in response to the movements of the driving wheel, and
- by the fact that the link organ comprises a first arm extending from the base and bearing the unidirectional transmission organ at its distal end, the flexible portion being arranged on the arm.

By virtue of these features, the arm of the link organ can be shaped and dimensioned, including for its flexible portion, so as to ensure good implementation of the unidirectional driving of the output wheel by the unidirectional transmission organ, while driving the link organ according to a simple rotational movement.

Preferably, the arm bears at least one additional flexible portion.

This feature provides the constructor of the mechanism with more flexibility with respect to the choice of form of the arm.

Generally, when the output wheel is intended to be pivoted about a second fixed axis of rotation, it is also possible to provide for the distal end of the arm to be secured to a radial guiding arm arranged to pivot about the second fixed axis of rotation while being free to revolve with reference to the output wheel.

In this case, it is also possible to provide for the unidirectional transmission organ to be arranged on the distal end so as to be able to pivot with reference thereto, about a third mobile axis of rotation, and bears a contact surface arranged to have an over-centre relationship with the driving surface of the output wheel, so that: the contact surface drives the driving surface in a first direction of relative rotation between the radial guiding arm and the output wheel, and the contact surface is displaced without driving the driving surface in the opposite direction of relative rotation between the radial guiding arm and the output wheel.

It is then advantageously possible to provide for the arm of the link organ or the radial guiding arm to bear an elastic return organ arranged to act on the unidirectional transmission organ and tend to position it in a predefined rest position.

Generally, provision can be made for the link organ to bear a second arm, having structural characteristics similar to those of the first arm and bearing an additional unidirectional transmission organ, arranged to drive the driving surface of the output wheel when the driving wheel is displaced in a second direction of displacement, opposite the first direction of displacement.

Such a construction is less restrictive from the point of view of the production of the components and their arrangement than in the prior art mechanism cited above, given that an arm bearing at least one flexible portion is associated with each of the unidirectional transmission organs.

In this case, it is advantageously possible to provide for the first and second arms to extend in respective general directions that are inclined with respect to one another by an angle of between 70 and 110 degrees.

According to a preferred variant embodiment, the present invention relates to an automatic winding mechanism comprising a transmission mechanism wholly or partly matching the features which have just been explained, and comprising a winding mass intended to be mounted on a frame element of the horological movement so as to be able to pivot with respect thereto and having a kinematic link with the driving plate.

In this case, it is preferably possible to provide for the winding mass to be arranged to exhibit oscillating movements of low amplitude, preferably less than 20 degrees, more preferably less than 10 degrees.

The present invention relates generally to a horological movement comprising a transmission mechanism matching the features set out above, whether or not it is incorporated in an automatic winding mechanism, and a timepiece comprising such a horological movement.

BRIEF DESCRIPTION OF THE DRAWINGS

Other features and advantages of the present invention will emerge more clearly on reading the following detailed description of a preferred embodiment, given with reference to the attached drawings that are given by way of nonlimiting example and in which:

FIG. 1 represents a schematic diagram of a part of a transmission mechanism according to the present invention, that makes it possible to explain the principle of operation thereof, FIG. 2 represents a simplified perspective view of a part of a transmission mechanism according to a preferred embodiment of the present invention, seen from a first face.

DESCRIPTION OF THE PREFERRED EMBODIMENTS

Figure 3A:
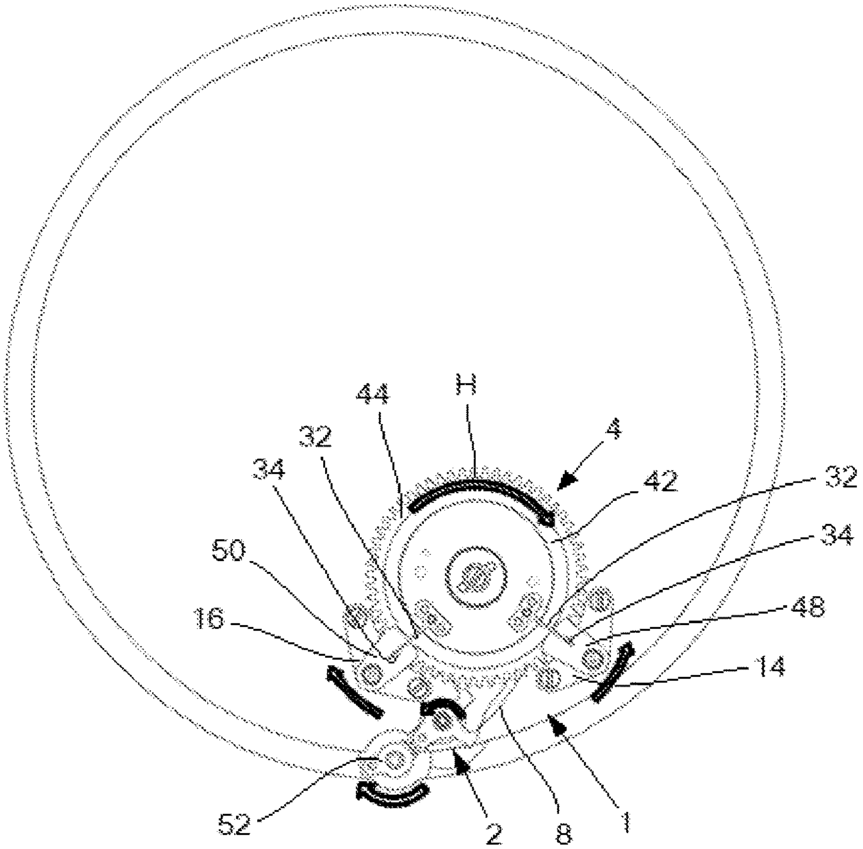
FIGS. 3*a* and 3*b* represent a same front view of the transmission mechanism of FIG. 2, seen from its second face and in two different respective phases of operation.

The following detailed description sets out to describe a horological transmission mechanism according to a preferred embodiment of the present invention as an illustrative and nonlimiting example. More specifically, according to the embodiment illustrated and described, the transmission mechanism is intended to be incorporated in an automatic winding mechanism of a timepiece, but, obviously, the person skilled in the art will be able to implement the transmission mechanism according to the invention in relation to other types of horological mechanisms without departing from the scope of the present invention as defined in the set of claims.

FIG. 1 represents a schematic diagram of a part of a transmission mechanism 1 according to the invention that makes it possible to explain the general principle of operation thereof.

Generally, the transmission mechanism 1 according to the invention is intended to convert bidirectional rotational movements of a driving wheel (not represented) into unidirectional rotation movements of a driven wheel. To this end, the transmission mechanism 1 notably comprises a link organ 2 intended to be driven in bidirectional rotation from the movements of the driving wheel and to drive, in turn, an output wheel 4 according to a unidirectional rotational movement.

When the transmission mechanism 1 according to the invention is incorporated in an automatic winding mechanism, it can advantageously be arranged to convert the bidirectional rotational movements of a winding mass (not represented) into unidirectional rotational movements, before the latter are transmitted to a mechanical energy storage organ to charge it with mechanical energy, typically a barrel spring (not represented).

Returning to the schematic diagram of FIG. 1, it appears that the link organ 2 comprises a base 6 intended to be mounted to rotate on a frame element of a horological movement.

The base 6 bears two arms 8, 10 extending in general directions that are inclined with respect to one another, towards a region close to the periphery of the output wheel 4, intended to be linked kinematically to the mechanical energy storage organ in the case of an automatic winding mechanism.

Each of the arms 8, 10 comprises, at its distal end, a support 14, 16 on which a unidirectional transmission organ 18, 20, having a general circular wheel form, is mounted to rotate, on an axis of rotation 22, 24. Finally, in the present examplary embodiment, a radial guiding arm 26, 28 is provided to link each support 14, 16 to the axis of rotation 30 of the output wheel 4 and thus maintain the corresponding axis of rotation 22, 24 at a constant distance from the axis of rotation 30.

It can be seen that each of the axis of rotation 22, 24 is slightly offset with respect to a radius passing through the axis of rotation 30 of the output wheel 4 and the point of contact thereof with the corresponding unidirectional transmission organ. Furthermore, each axis of rotation 22, 24 is preferably slightly off-centre with respect to the circular periphery of the corresponding unidirectional transmission organ, the circular periphery defining a contact surface with the output wheel 4.

Thus, it appears that, starting from the configuration illustrated in FIG. 1, if the unidirectional transmission organ 18 pivots in the clockwise direction of rotation, it will exhibit an increasingly greater radius over the radius passing through the axis of rotation 30 of the output wheel 4 and the point of contact thereof with the unidirectional transmission organ 18. Such a situation occurs when the link organ 2 turns in the clockwise direction in the view of FIG. 1.

The distance between the axis of rotation 22 of the unidirectional transmission organ 18 and the periphery of the output wheel 4 being kept constant, the pivoting of the unidirectional transmission organ 18 will give rise to an over-centre link with the output wheel 4 after a certain time, that is to say when its radius situated between its axis of rotation 22 and its point of contact with the periphery of the output wheel 4 becomes sufficiently great to prevent a free pivoting of the unidirectional transmission organ 18. From that instant, any subsequent rotation of the link organ 2 in the same direction of rotation (clockwise in the view of FIG. 1) also drives a rotation of the output wheel 4 in the same direction of rotation, by virtue of the significant frictions that arise between the latter and the unidirectional transmission organ 18 which, for its part, can then no longer pivot on its axis of rotation 22.

Conversely, when the link organ 2 turns in the counterclockwise direction in the view of FIG. 1, the unidirectional transmission organ 18 turns also in the counterclockwise direction. By following such a movement, its radius situated between its axis of rotation 22 and its point of contact with the periphery of the output wheel 4 tends to decrease. The unidirectional transmission organ 18 can therefore turn freely (again, if it was in an over-centre link situation) with respect to the output wheel 4. Thus, when the link organ 2 pivots in the counterclockwise direction of rotation, the unidirectional transmission organ 18 does not drive the output wheel 4 in rotation.

It emerges from FIG. 1 that the other unidirectional transmission organ 20 is mounted on its support 16 in a way similar to that of the unidirectional transmission organ 18. However, the arms 8 and 10 extend on either side of the straight line passing through the centres of the link organ 2 and of the output wheel 4. Because of this, for a given direction of rotation of the link organ 2, the two unidirectional transmission organs 18 and 20 cooperate with the periphery of the output wheel 4 so that they pivot in respective opposing directions of rotation. Consequently, each of the unidirectional transmission organs 18, 20 is associated with a given direction of rotation of the link organ 2, in which it has an over-centre link with the output wheel 4 to drive the latter in rotation.

In the configuration illustrated in FIG. 1, a rotation of the link organ 2 in the clockwise direction therefore drives a rotation of the unidirectional transmission organ 18 in the same direction, which tends to place it in an over-centre link situation with the output wheel 4 to drive the latter in the clockwise direction of rotation. At the same time, the unidirectional transmission organ 20 revolves freely in the counterclockwise direction without exerting any particular action on the periphery of the output wheel 4.

Conversely, a rotation of the link organ 2 in the counterclockwise direction of rotation drives a free rotation in the same direction of the unidirectional transmission organ 18, with reference to the output wheel 4. At the same time, the unidirectional transmission organ 20 revolves in the clockwise direction, which tends to place it in an over-centre link situation with the output wheel 4 to drive the latter in the clockwise direction of rotation.

Thus, whatever the direction of rotation of the link organ 2, the unidirectional transmission organs 18, 20 alternately ensure the driving of the output wheel 4 in one and the same direction.

It will be noted that a return spring 32 is preferably associated with each unidirectional transmission organ 18, 20, by cooperating with a pin 34 secured to the latter, to prevent its orientation from moving too far away from the orientation in which the over-centre interaction with the output wheel 4 occurs, and thus ensure a greater responsiveness of the transmission mechanism according to the invention, particularly upon changes of the direction of driving of the link organ 2.

Obviously, the principle of operation which has just been described can be implemented with a single arm bearing a single unidirectional transmission organ. In this case, when the transmission mechanism is incorporated in an automatic winding mechanism for example, only one direction of rotation of the winding mass will contribute to the charging of the mechanical energy storage organ.

According to a preferred embodiment of the invention, but in a nonlimiting manner, each of the arms 8, 10 has, between its proximal end secured to the base 6 of the link organ 2 and its distal end comprising the corresponding support 14, 16, two flexible portions 36 intended to allow the arm 8, 10 to be deformed when the link organ 2 is driven in rotation, while ensuring a suitable guiding of the corresponding unidirectional transmission organ 18, 20.

The person skilled in the art will have no particular difficulty in adapting the form of the arms according to its specific needs and, notably, to modify the number of flexible portions thereof without in any way departing from the scope of the present invention as defined by the claims.

In the case where the transmission mechanism comprises two arms 8, 10, the latter can advantageously have between them an angle of the order of 70 to 110 degrees but, obviously, the person skilled in the art will be able to also adapt this indicative value according to the form finally retained to produce the arms and according to the number of flexible portions that they include. In that respect, it will also be noted that the two arms do not necessarily comprise the same number of flexible portions.

Figure 3B:
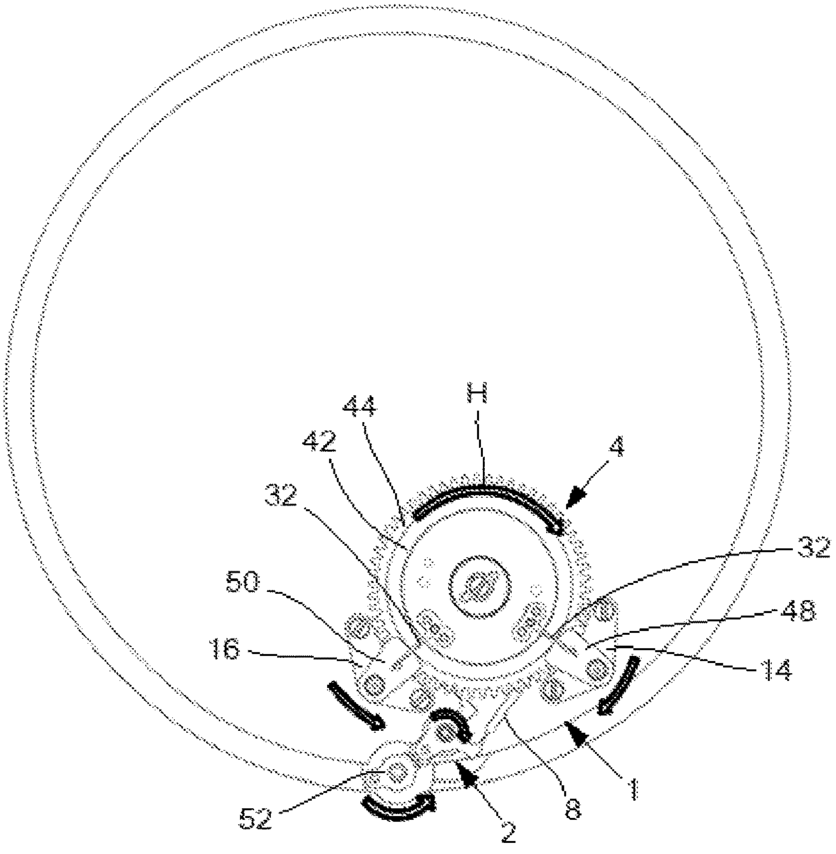

FIG. 2 represents a simplified perspective view of a part of a transmission mechanism 1 according to a preferred embodiment of the present invention, seen from a first face, allowing a better appreciation of certain construction details. Furthermore, FIGS. 3*a* and 3*b* represent a same front view of the transmission mechanism 1 of FIG. 2, seen from its second face and in two different respective phases of operation.

According to this embodiment illustrated as a nonlimiting illustration, the link organ 2 is associated with a driving plate 40, having teeth and secured in rotation to the base 6, to define a transmission wheel. The driving plate 40 is intended to have, via its teeth, a kinematic link with the driving wheel, for example a winding mass, to ensure the driving of the base 6 and therefore of the arms 8, 10.

Alternatively, the driving plate 40 will of course be able to be produced in a single piece with the base 6 without departing from the scope of the invention and/or will be able to comprise other link means with the driving wheel. In fact, other link methods between the link organ 2 and the driving wheel will be able to be implemented without in any way departing from the scope of the invention.

The output wheel 4 comprises a driving surface defined by the periphery of a first driven wheel 42, arranged to cooperate by friction with peripheral contact surfaces of unidirectional transmission organs 48, 50, and secured to a driving toothed wheel 44, intended to have a kinematic link with a driven wheel (not represented), for example a winding ratchet of a barrel spring. Thus, the unidirectional transmission organs 48, 50 are intended to drive the first driven wheel 42 in a single direction of rotation, such that the driving toothed wheel 44 can drive the driven wheel in rotation in one and the same direction and do so regardless of the direction of rotation of the driving wheel. Alternatively, the driven wheel could be driven directly by the output wheel 4.

It will be noted that the unidirectional transmission organs 48, 50 here have a different form from that illustrated in FIG. 1. In fact, each of these organs takes the form of a pad having a slight asymmetry with respect to its median plane. It appears from a minute examination of FIGS. 3*a* and 3*b* that each pad has a radius that is slightly larger on the left of its median plane than on the right.

The driving plate 40 is arranged engaged with an intermediate link wheel 52 intended to be driven in rotation by the driving wheel. According to the embodiment illustrated in FIGS. 2, 3*a* and 3*b*, in a nonlimiting manner, it is provided for the driving wheel to perform small oscillations about a position of equilibrium, such that the intermediate link wheel 52 is driven to exhibit to-and-fro motions, like the link organ 2.

FIG. 3*a* illustrates the operation of the transmission mechanism 1 when the intermediate link wheel 52 is driven in rotation in the clockwise direction. The link organ 2 is then driven in rotation in the counterclockwise direction and the distal ends of the arms 8, 10 move away from the base 6 of the link organ 2. In this case, the unidirectional transmission organ 50 cooperates with the first driven wheel 42 so as to pivot in the clockwise direction of rotation, while the organ 48 pivots in the counterclockwise direction of rotation, in the view of FIG. 3*a*. The organ 50, in this case, exhibits a radius to the direction of the first driven wheel 42 which is increasing, while the organ 48 exhibits a radius to the direction of this same wheel 42 which is decreasing. Consequently, the organ 50 enters into an over-centre relationship with the first driven wheel 42, while the organ 48 is free to revolve without acting on this same wheel 42. This is reflected by a driving of the first driven wheel 42 in the clockwise direction of rotation in the view of FIG. 3*a*, as illustrated by the arrow H.

FIG. 3*b* illustrates the operation of the transmission mechanism 1 when the intermediate link wheel 52 is driven in rotation in the counterclockwise direction. The link organ 2 is then driven in rotation in the clockwise direction and the distal ends of the arms 8, 10 move closer to the base 6 of the link organ 2. In this case, the unidirectional transmission organ 50 cooperates with the first driven wheel 42 so as to pivot in the counterclockwise direction of rotation, while the organ 48 pivots in the clockwise direction of rotation, in the view of FIG. 3*b*. The organ 48, in this case, exhibits a radius to the direction of the first driven wheel 42 which is increasing, while the organ 50 exhibits a radius to the direction of this same wheel 42 which is decreasing. Consequently, the organ 48 enters into an over-centre relationship with the first driven wheel 42, while the organ 50 is free to revolve without acting on this same wheel 42. This is reflected once again by a driving of the first driven wheel 42 in the clockwise direction of rotation in the view of FIG. 3*b*, symbolized by the arrow H.

As already explained previously, on each change of direction of rotation, the unidirectional transmission organ 48, 50 which is in an over-centre relationship with the first driven wheel 42 leaves this state rapidly presenting a decreasing radius allowing it to pivot without interacting with the first driven wheel 42. Conversely, the other unidirectional transmission organ rapidly presents an increasing radius to the first driven wheel 42 and enters into an over-centre relationship therewith.

By virtue of the features which have just been presented, a horological mechanism is obtained for the transmission of a rotational movement between a driving wheel and a driven wheel, with unidirectional conversion that exhibits a construction and assembly mode that are at the same time simple, precise and reliable. Furthermore, this mechanism operates with less friction than the prior solution described above and thus offers an excellent efficiency.

The implementation of the present invention is not limited to the exact geometry of the various components of the mechanism as has been illustrated and described. In fact, the person skilled in the art will have no particular difficulty in adapting the present teaching to the implementation of a transmission mechanism matching the features of the present invention, by implementing a number of arms of the link organ suited to its specific needs, like the number and the placement of their flexible portions, or even the form of the unidirectional transmission organs or the way they are set out in the transmission mechanism.

As already specified above, such a transmission mechanism is perfectly suited to incorporation in an automatic winding mechanism to transmit the bidirectional movements of a winding mass to a mechanical energy storage organ, but it will be able to be implemented in relation to any other type of suitable horological system without departing from the scope of the invention. It will be noted in this case that the winding mass can advantageously be arranged to exhibit oscillating movements of a low amplitude, preferably less than 20 degrees, more preferably less than 10 degrees, to favour the construction of a compact automatic winding mechanism.

What is claimed is:

1. A transmission mechanism, for a horological movement, configured to transmit movements from a driving wheel to a driven wheel of the horological movement, the mechanism comprising:

a transmission wheel comprising a driving plate configured to be linked kinematically to the driving wheel and to pivot about a first fixed axis of rotation in response to the movements of the driving wheel, and a link organ having a flexible portion and bearing a unidirectional transmission organ configured to cooperate with a driving surface of an output wheel configured to be linked to the driven wheel and to drive said driving surface when the driving wheel is displaced in a first direction of displacement, said link organ comprising a base secured to said driving plate and configured to exhibit a rotational movement about said first fixed axis of rotation, in response to the movements of the driving wheel, and a first arm extending from said base and bearing said unidirectional transmission organ at a distal end of the first arm, said flexible portion being disposed on said first arm.

2. The mechanism of claim 1, wherein said first arm bears at least one additional flexible portion.

3. The mechanism of claim 1, wherein said output wheel is configured to be pivoted about a second fixed axis of rotation, and wherein said distal end of said first arm is secured to a radial guiding arm configured to pivot about said second fixed axis of rotation while being free to revolve with reference to said output wheel.

4. The mechanism of claim 2, wherein said output wheel is configured to be pivoted about a second fixed axis of rotation, and wherein said distal end of said first arm is secured to a radial guiding configured to pivot about said second fixed axis of rotation while being free to revolve with reference to said output wheel.

5. The mechanism of claim 3, wherein said unidirectional transmission organ is disposed on said distal end to be able to pivot with reference thereto, about a third mobile axis of rotation, the unidirectional transmission organ bearing a contact surface configured to have an over-center relationship with said driving surface of said output wheel, so that:

said contact surface drives said driving surface in a first direction of relative rotation between said radial guiding arm and said output wheel, and said contact surface is displaced without driving said driving surface in the opposite direction of relative rotation between said radial guiding arm and said output wheel.

6. The mechanism of claim 4, wherein said unidirectional transmission organ is disposed on said distal end to be able to pivot with reference thereto, about a third mobile axis of rotation, the unidirectional transmission organ bearing a contact surface configured to have an over-center relationship with said driving surface of said output wheel, so that:

said contact surface drives said driving surface in a first direction of relative rotation between said radial guiding arm and said output wheel, and said contact surface is displaced without driving said driving surface in the opposite direction of relative rotation between said radial guiding arm and said output wheel.

7. The mechanism of claim 5, wherein said first arm or said radial guiding arm bears an elastic return organ configured to act on said unidirectional transmission organ and position said unidirectional transmission organ in a predefined rest position.

8. The mechanism of claim 6, wherein said first arm or said radial guiding arm bears an elastic return organ configured to act on said unidirectional transmission organ and position said unidirectional transmission organ in a predefined rest position.

9. The mechanism of claim 1, wherein said link organ bears a second arm, having structural characteristics similar to structural characteristics of said first arm and bearing an additional unidirectional transmission organ configured to drive said driving surface of said output wheel when the driving wheel is displaced in a second direction of displacement, opposite said first direction of displacement.

10. The mechanism of claim 6, wherein said link organ bears a second arm, having structural characteristics similar to structural characteristics of said first arm and bearing an additional unidirectional transmission organ configured to drive said driving surface of said output wheel when the driving wheel is displaced in a second direction of displacement, opposite said first direction of displacement.

11. The mechanism of claim 9, wherein said first arm and said second arm extend in respective general directions that are inclined with respect to one another by an angle of between 70 and 110 degrees.

12. The mechanism of claim 10, wherein said first arm and said second arm extend in respective general directions that are inclined with respect to one another by an angle of between 70 and 110 degrees.

13. An automatic winding mechanism comprising:

the transmission mechanism according to claim 1; and a winding mass configured to be mounted on a frame element of the horological movement to pivot with reference thereto and having a kinematic link with said driving plate.

14. An automatic winding mechanism comprising:

the transmission mechanism according to claim 6; and a winding mass configured to be mounted on a frame element of the horological movement to pivot with reference thereto and having a kinematic link with said driving plate.

15. An automatic winding mechanism comprising:

the transmission mechanism according to claim 10; and a winding mass configured to be mounted on a frame element of the horological movement to pivot with reference thereto and having a kinematic link with said driving plate.

16. An automatic winding mechanism comprising:

the transmission mechanism according to claim 12; and a winding mass configured to be mounted on a frame element of the horological movement to pivot with reference thereto and having a kinematic link with said driving plate.

17. The automatic winding mechanism according to claim 13, wherein said winding mass is configured to exhibit oscillating movements of low amplitude.

18. The automatic winding mechanism according to claim 15, wherein said winding mass is configured to exhibit oscillating movements of low amplitude.

19. The automatic winding mechanism according to claim 16, wherein said winding mass is configured to exhibit oscillating movements of low amplitude.

20. A horological movement comprising:

the transmission mechanism according to claim 1.

21. A horological movement comprising:

the transmission mechanism according to claim 6.

22. A horological movement comprising: the transmission mechanism according to claim 10.

23. A horological movement comprising:

the automatic winding mechanism according to claim 13, wherein said output wheel comprises a toothed driving wheel having a kinematic link with an end of an elastic mechanical energy storage organ to charge the elastic mechanical energy storage organ.

24. A horological movement comprising:

the automatic winding mechanism according to claim 15, wherein said output wheel comprises a toothed driving wheel having a kinematic link with an end of an elastic mechanical energy storage organ to charge the elastic mechanical energy storage organ.

25. A horological movement comprising:

the automatic winding mechanism according to claim 16, wherein said output wheel comprises a toothed driving wheel having a kinematic link with an end of an elastic mechanical energy storage organ to charge the elastic mechanical energy storage organ.

26. A timepiece comprising:

the horological movement according to claim 20.

27. A timepiece comprising:

the horological movement according to claim 21.

28. A timepiece comprising:

the horological movement according to claim 22.

29. A timepiece comprising:

the horological movement according to claim 23.

30. A timepiece comprising:

the horological movement according to claim 24.

31. A timepiece comprising:

the horological movement according to claim 25.

* * * * *